United States Patent [19]
Pierre

[11] 3,749,396
[45] July 31, 1973

[54] APPARATUS FOR AUTOMATICALLY PLACING PHONOGRAPH RECORD LABELS INSIDE THE MOULD OF A PARALLEL-PLATEN PRESS

[75] Inventor: Marcel J. Pierre, Cheptainville, France

[73] Assignee: Material Applications Plastiques, Paris, France

[22] Filed: Feb. 8, 1971

[21] Appl. No.: 113,590

[30] Foreign Application Priority Data
Feb. 12, 1970 France .............................. 7004973

[52] U.S. Cl. ............... 271/5, 214/1 BT, 221/312 A, 271/9, 271/14, 425/114
[51] Int. Cl. .......................... B65h 3/08, B65h 5/10
[58] Field of Search ..................... 271/14, 9, 10, 11, 271/5, 4, 3, 26 E; 221/211, 312 A; 214/1 BT; 425/242, 247, 126, 127, 114

[56] References Cited
UNITED STATES PATENTS
| | | | |
|---|---|---|---|
| 3,602,496 | 8/1971 | Langenohl | 271/14 |
| 2,524,846 | 10/1950 | Socke et al. | 271/14 X |
| 3,131,594 | 5/1964 | Benson | 271/14 X |
| 2,994,458 | 8/1961 | Rise et al. | 221/312 A |
| 3,166,202 | 1/1965 | Arnold | 214/1 BT |
| 3,292,209 | 12/1966 | Borkmann | 425/126 |
| 3,619,858 | 11/1971 | Sutch | 221/211 X |

Primary Examiner—Evon C. Blunk
Assistant Examiner—Bruce H. Stoner, Jr.
Attorney—Woodhams, Blanchard & Flynn

[57] ABSTRACT

An apparatus for automatically placing a pair of phonograph record labels inside the mold of the parallel-platen press. The apparatus includes a carrier head having movable suction devices fitted at opposite ends thereof and disposed for holding the labels, said suction devices being movable toward and away from each other and relative to the carrier head. The suction devices, when the carrier head is in a first position, are movable outwardly away from one another to pick up labels from two label holding magazines arranged on opposite sides of the carrier head. A transfer device is connected to the carrier head for moving same from said first position to a second position located between the two open halves of the press mold, whereupon the suction devices are again moved outwardly away from one another to simultaneously deposit the two labels inside the two open halves of the mold.

5 Claims, 3 Drawing Figures

PATENTED JUL 31 1973 3,749,396
SHEET 2 OF 2
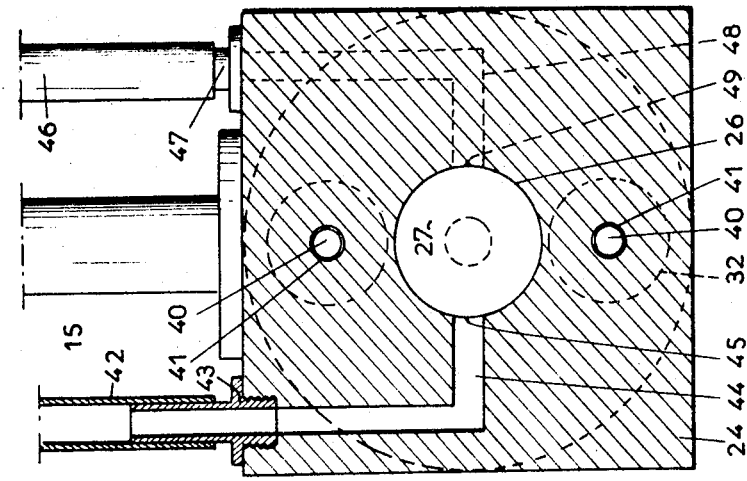
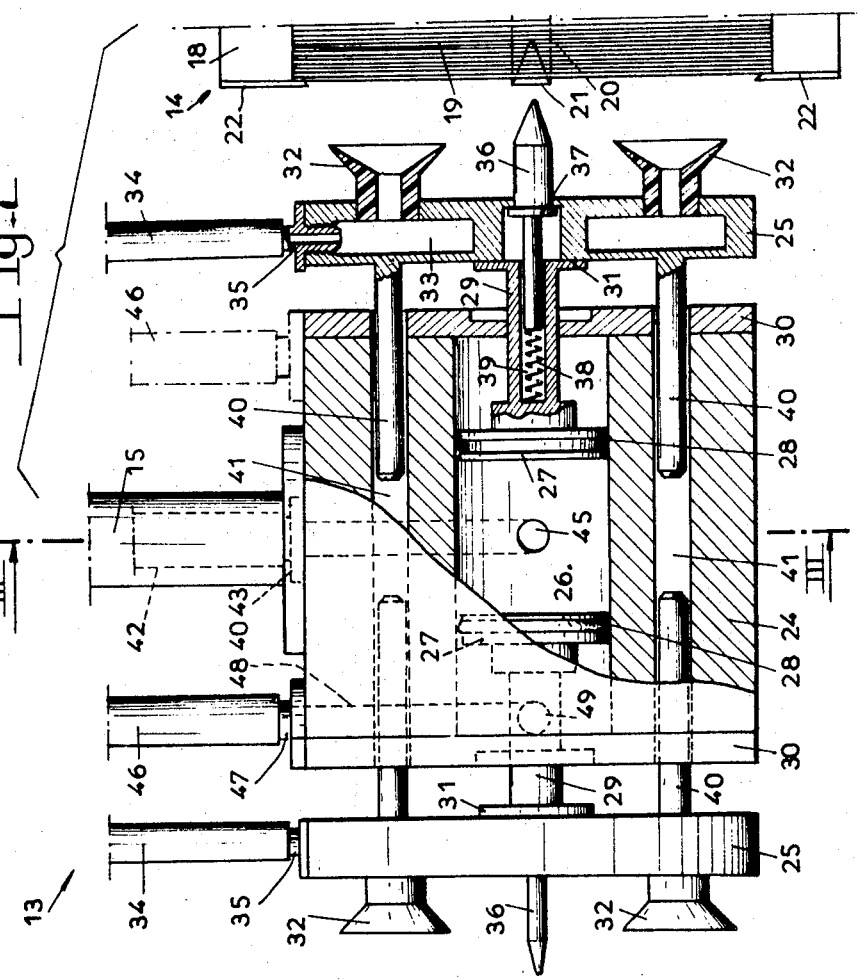
INVENTOR
MARCEL J. PIERRE
BY
Woodhams, Blanchard and Flynn
ATTORNEYS

APPARATUS FOR AUTOMATICALLY PLACING PHONOGRAPH RECORD LABELS INSIDE THE MOULD OF A PARALLEL-PLATEN PRESS

The present invention concerns apparatus for automatically placing phonograph record labels inside the mould of a parallel-platen press.

Various types of parallel-platen press are known for manufacturing phonograph records, particularly injection-moulding presses. Generally, the labels that have to be provided on the two sides of the finished record are placed in position after the record has been pressed. More recently machines have been developed whereby the labels are placed directly inside the mould before pressing of the record. These labels are usually placed inside the mould by hand, but it is also known to use automatic equipment able to carry out this operation. However, the automatic means at present known are very complicated and their use consequently greatly increases the cost of manufacturing the records. Furthermore, they generally operate quite slowly and not very reliably.

The object of the present invention is to provide automatic apparatus for placing the labels inside the mould, which apparatus is simple and inexpensive while at the same time operating in a reliable and rapid manner.

To achieve this, the apparatus of the invention is mainly characterized in that it comprises: a carrier head having two movable parts provided at their ends with means for holding the labels and adapted to move away from or towards each other as required in such manner that each moving part picks up a label from two label magazines arranged one on either side of this head; and transfer means for moving said head between the two halves of the open mould of the press so as to deposit the two labels simultaneously inside these two halves of the mould.

It will be readily appreciated that such apparatus functions reliably and very rapidly since the two labels required for a record are picked up simultaneously from the two magazines and they are then deposited likewise simultaneously inside the two halves of the mould.

In one particular embodiment of the invention, the two movable parts of the carrier head are constituted by two pistons which slide in a single cylinder fed by a pressurized-fluid source.

Thanks to this arrangement, the contraction or expansion of the carrier head can be carried out in a extremely simple and inexpensive manner.

Preferably, the holding means forming part of the carrier head are constituted by suction elements connected to a vacuum source, whereas the transfer means are constituted by a fluid-operated plunger.

Advantageously, each of the moving parts of the carrier head comprises a retractable needle, cooperating with the hollow end of a central rod on which are threaded the labels in their particular magazines, so as to ensure correct positioning of the labels on the carrier head.

An embodiment of the invention will now be described by way of example and by reference to the attached drawings in which:

FIG. 2 is a detail view, partly in section and on a larger scale, of the carrier head forming part of this apparatus; and FIG. 3 is a sectional view on the line III—III of FIG. 2.

Figure 1:
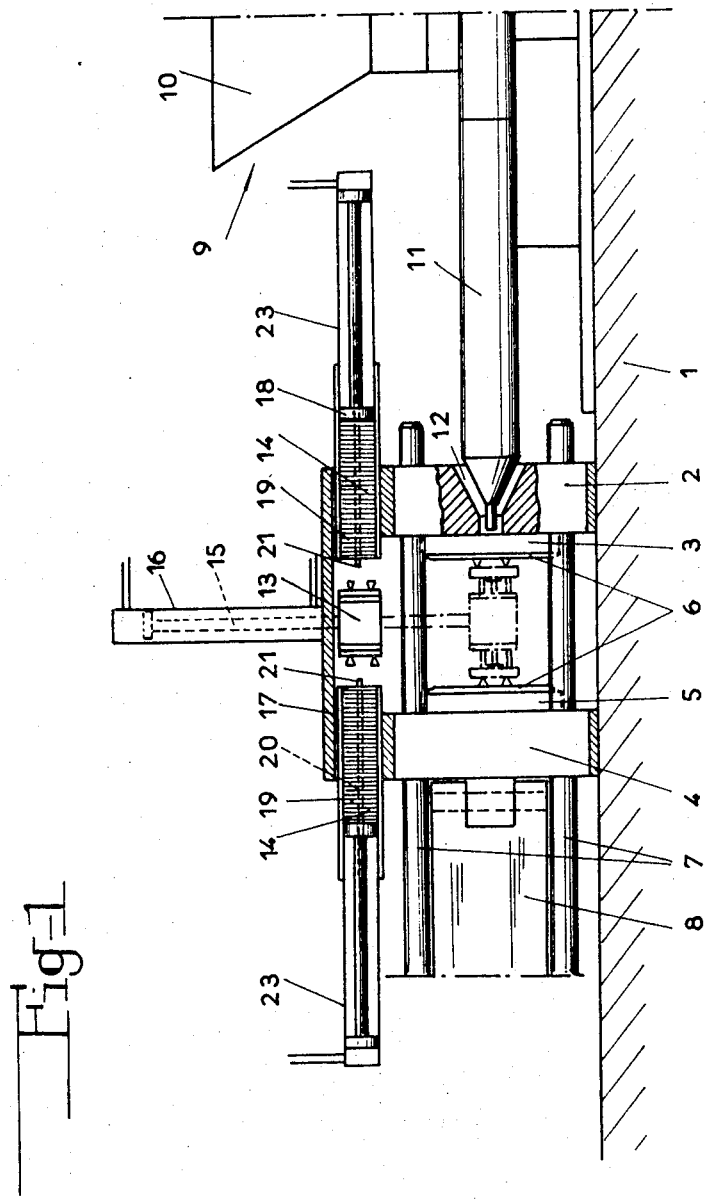
FIG. 1 is a simplified general view of an injection-moulding press fitted with label-positioning apparatus in accordance with the invention.

The injection-moulding press illustrated in FIG. 1 is of a known type and its main components, carried on a horizontal frame 1, are a fixed platen 2 carrying one half 3 of the mould and a moving platen 4 carrying the other half 5 of this mould. Furthermore, since this press is intended for use in the manufacture of phonograph records, each of the halves 3 and 5 of the mould is adapted to accommodate a matrix such as that shown at 6, corresponding to the record to be pressed.

In likewise known manner the movable platen 4 is guided in its translatory movement parallel to the fixed platen 2 by four horizontal guide bars 7, which are disposed at the corners of a square and the ends of which are secured to the fixed platen 2 and to a bracket, not illustrated, which is solidly connected to the frame 1. This movable platen 4 is displaced by a toggle mechanism 8, or by any other suitable transfer means.

The press is completed by a means 9 for injecting the material to be moulded which means comprises, in addition to a feed hopper 10, an injection nozzle 11, the end of which is adapted to pass through an opening 12 in the fixed platen 2, so as to supply the material to be moulded directly to the interior of the mould formed by the two halves 3 and 5.

In accordance with the invention, this injection-moulding press is equipped with apparatus enabling the labels, that are to be applied to the two sides of each phonograph record, to be automatically placed inside the mould. This apparatus mainly comprises a carrier head 13 and two label magazines 14.

The carrier head 13, which will be described in more detail below, is secured to the end of the piston rod 15 of a fluid-operated pressure cylinder 16, the body of which is supported by a plate 17 solidly connected to the frame 1 of the press. Under the action of this cylinder 16, the carrier head 13 can be vertically displaced from an upper, at-rest position, shown in solid lines in FIG. 1, to a lower, working position, shown in broken lines in FIG. 1.

The two label magazines 14 are each arranged on either side of the head 13 in the at-rest position, and in alignment with the head, as illustrated in FIG. 1. Each of these magazines 14 is constituted mainly by four horizontal bars 18, which are arranged at the corners of a square and between which are packed the phonograph record labels 19. These labels 19 are also perforated at their centres and they are positioned on a central rod 20 which forms part of the magazine and one recessed end 21 of which projects towards the head 13. Each pack of labels 19 is held, at that side presented to the head 13, by fingers carried by the bars 18, whereas at the other end the pack of labels is subjected to slight constant pressure from a suitable plunger 23.

Referring to FIGS. 2 and 3 it will be seen that the carrier head 13 consists mainly of a body 24 of parallelepiped form, secured to the end of the rod 15 of the cylinder 16, and of two movable parts 25 in the form of ciruclar plates, each disposed on either side of the body 24 and facing a magazine 14. In accordance with the invention, the two circular plates 25 are adapted to move simultaneously towards or away from the body 24 with the help of means described below.

The body 24 has a central cylindrical bore 26 in which slide two pistons 27, which are disposed end-on to each other and are adapted to displace the two movable parts 25 of the carrier head simultaneously. Each of these pistons 27 is fitted with a ring seal 28 and comprises a rod 29 which projects outwardly through an opening in an end-plate 30 secured to the body 24. The outer end of each rod 29 is secured to one of the circular plates 25 by means of a shoulder 31 provided for the purpose.

Each circular plate 25 is provided with means for holding the labels, these means here being constituted by two suction elements 32. Each of these two suction elements terminates in the interior of an annular chamber 33 formed in the circular plate 25, and they are connected to a vacuum source, not illustrated, by means of a flexible pipe 34 connected to a union 35 which likewise leads into the interior of this annular chamber 33.

Fitted at the centre of each circular plate 25 is a retractable needle 36, the tapered end of which is adapted to cooperate with the recessed end 21 of the central rod 20 of the associated label magazine; the purpose of this arrangement will be explained in more detail below. This needle 36 has a shoulder 37 acting as a stop, and it is forwardly biased by a return spring 38, that is to say, it is biased towards the associated label magazine. The return spring is fitted in an axial bore 39 provided for the purpose in the piston rod 29, the rear portion of the needle 36 also sliding in this bore.

Finally, each cylindrical plate 25 carries on its rear face two cylindrical rods 40 which slide freely in two bores 41 provided for the purpose in the body 24 of the carrier head, so that the two circular plates 25 are correctly positioned in relation to this body 24.

The pistons 27 are displaced in the cylinder constituted by the bore 26 by means of a pressurized-fluid source, for example a compressed-air source, not illustrated. This pressurized-fluid source is connected on the one hand to a flexible pipe 42 connected through a union 43 to a passage 44 which leads into the interior of the cylinder 26 through an orifice 45 located between the two pistons 27, thus enabling the carrier head to expand, i.e., enabling the two movable parts 25 to move away from each other simultaneously. The pressurized fluid source is also connected to two flexible pipes 46 connected through two unions 47 to two passages 48 which lead into the interior of the cylinder 26 through two orifices 49 located at the side of the rods of the two pistons 27, this enabling the carrying head 13 to be contracted, i.e., enabling the two movable parts 25 to move towards each other simultaneously.

The automatic label-positioning apparatus described above operates in the following manner:

Initially, the carrier head 13 is in its upper contracted at-rest position, i.e., as shown in solid lines in FIG. 1.

The first phase of the operating cycle of the apparatus consists in expanding the carrier head 13. This expansion is achieved by passing pressurized fluid to the interior of the cylinder 26 and between the two pistons 27, by means of the flexible pipe 42 and the passage 44. As this happens, the two pistons 27 move away from each other, and the two movable parts 27 solidly connected to the pistons are then displaced towards their respective magazines 14, which have previously been filled with labels 19. During this displacement of the moving parts 25 towards the label magazines 14, the tapered end of each of the needles 36 enters the recessed portion of each central rod 20. These needles 36 are then pushed towards the interior of the head 13, thereby overcoming the bias of the return springs 38, this movement continuing until the suction elements 32 move into contact with the front label in each of the magazines 14.

The suction elements 32 are then actuated through the flexible pipes 34, and then the head 13 is caused to contract by passing the pressurized fluid, not between the two pistons 27, but to the side of the rods of these pistons through the flexible pipes 46 and the passages 48. As this happens, each of the suction elements 32 picks up a label 19 from one of the magazines 14, because of slight deformation of the label which enables it to pass by the retaining fingers 22. It will also be seen that, with the help of the needles 36 each of which constitutes a continuation of the central rods 20 of the magazines, the two labels that have been picked up are perfectly positioned on the two moving parts 25 of the carrier head 13.

The carrier head 13 is then located in its starting position but it now carries two phonograph record labels 19. Under the action of the transfer cylinder 16, the head 13, still in the contracted position, is then downwardly displaced between the two halves 3 and 5 of the open mould of the press, this downward movement continuing as far as the axis of the press.

The pressurized fluid is then again passed between the two pistons 27 by way of the flexible pipe 42, and thus causes a fresh expansion of the head 13 which then assumes the position illustrated in broken lines in FIG. 1. When this expansion of the head takes place, the two labels 19 carried by the suction elements 32 are applied against the two matrices 6 in the two halves 3 and 6 of the mould. Correct centering of these two labels again being ensured by the needles 36 which each cooperate with studs of appropriate shape provided at the centre of each of the two halves of the mould.

The suction action of the elements 32 which is provided with the help of the flexible pipes 34 is then interrupted, whereas the head 13 is again contracted. Since the labels 19 are no longer retained by the suction elements 32, they remain in position inside the matrices 6 on their respective studs while the head 13 is contracting. Suction valves could also be advantageously provided in the two halves 3 and 5 of the mould so as to hold the labels firmly against the matrices and thus to prevent them from becoming detached from the studs which are relatively small.

The head 13 then ascends to its initial position under the action of the transfer cylinder 16, and is thus ready to carry out a new operating cycle, whereas moulding proper of the phonograph record can begin. This moulding operation is carried out in the conventional manner and will not be described here, but it will be readily appreciated that the use of the apparatus for automatically positioning labels, in accordance with the invention, enables the production rate of a press thus equipped to be greatly increased, while great operational reliability is ensured.

I claim:

1. An apparatus for manipulating a pair of articles, and particularly for positioning a pair of phonograph record labels inside the mold halves of a parallel platen press, comprising:

carrier means mounted for substantially linear movement in a first direction between substantially first and second positions, said carrier means when in said second position being disposed between said mold halves when said press is in an open position;

transfer means connected to said carrier means for linearly moving same between said first and second positions;

first and second magazine means disposed closely adjacent and on opposite sides of said carrier means when same is in said first position, each of said magazine means having a stack of labels disposed therein with said labels being stacked in a direction extending substantially perpendicular to said first direction, said labels each having a central opening therein;

first and second label engaging means movably mounted on said carrier means for movement in a second direction substantially perpendicular to said first direction, said first and second label engaging means being movably mounted on said carrier means on substantially opposite sides thereof and being substantially aligned with said first and second magazine means, respectively, when said carrier means is in said first position;

each said label engaging means including a platelike member slidably mounted on said carrier means for movement in said second direction, said platelike member having a suction member mounted on one face thereof disposed in opposed relationship to said stack of labels;

suction means communicating with said suction member for enabling said suction member to engage and remove the endmost label from said stack;

each said label engaging means including center pin means mounted thereon and projecting outwardly beyond said suction member for projecting through the central opening of the label removed from said magazine means for maintaining said label properly positioned on said label engaging means;

power means for causing simultaneous movement of said first and second label engaging means in opposite directions relative to said carrier means for causing said first and second label engaging means to simultaneously extend or contract relative to said carrier means in said second direction, said first and second label engaging means being extendible from said carrier means when same is in said first position for engaging the endmost label of each magazine means for permitting said carrier means to thus pick up a pair of labels, said carrier means being then transferred to said second position whereupon said first and second label engaging means are again extended outwardly relative to said carrier means for causing said pair of labels to be positioned in the open opposed mold halves of the press.

2. An apparatus for manipulating a pair of articles, and particularly for positioning a pair of phonograph record labels inside the mold halves of a parallel platen press, comprising:

carrier means mounted for substantially linear movement in a first direction between substantially first and second positions, said carrier means when in said second position being disposed between said mold halves when said press is in an open position;

transfer means connected to said carrier means for linearly moving same between said first and second positions;

first and second magazine means disposed closely adjacent and on opposite sides of said carrier means when same is in said first position, each of said magazine means having a stack of labels disposed therein with said labels being stacked in a direction extending substantially perpendicular to said first direction;

first and second label engaging means movably mounted on said carrier means for movement in a second direction substantially perpendicular to said first direction, said first and second label engaging means being movably mounted on said carrier means on substantially opposite sides thereof and being substantially aligned with said first and second magazine means, respectively, when said carrier means is in said first position;

power means for causing simultaneous movement of said first and second label engaging means in opposite directions relative to said carrier means for causing said first and second label engaging means to simultaneously extend or contract relative to said carrier means in said second direction, said first and second label engaging means being extendible from said carrier means when same is in said first position for engaging the endmost label of each magazine means for permitting said carrier means to thus pick up a pair of labels, said carrier means being then transferred to said second position whereupon said first and second label engaging means are again extended outwardly relative to said carrier means for causing said pair of labels to be positioned in the open opposed mold halves of the press;

said power means including an elongated cylindrical bore formed in said carrier means and first and second pistons coaxially aligned and slidably disposed within said bore, said first and second pistons being free of direct interconnection therebetween and in conjunction with the wall defining said bore defining a fluid pressure chamber therebetween, said first and second pistons being connected to said first and second label engaging means, respectively, for causing opposed extension and retraction of said label engaging means relative to said carrier means, and fluid pressure means communicating with said chamber for permitting pressure fluid to be supplied thereto for causing said first and second pistons to be simultaneously moved outwardly in opposite directions for causing said first and second label engaging means to be simultaneously moved outwardly away from one another and outwardly relative to said carrier means.

3. An apparatus for manipulating a pair of articles, and particularly for positioning a pair of phonograph record labels inside the mold halves of a parallel platen press, comprising:

carrier means mounted for substantially linear movement in a first direction between substantially first and second positions, said carrier means when in said second position being disposed between said mold halves when said press is in an open position;

transfer means connected to said carrier means for linearly moving same between said first and second positions;

first and second magazine means disposed closely adjacent and on opposite sides of said carrier means when same is in said first position, each of said magazine means having a stack of labels disposed therein with said labels being stacked in a direction extending substantially perpendicular to said first direction, said labels each having a central opening formed therein, and each said magazine means having an elongated central guide rod adapted to extend through the aligned central openings of said stack of labels, said central guide rod of each magazine means having a recess formed in the free end thereof positioned adjacent said carrier means first and second label engaging means movably mounted on said carrier means for movement in a second direction substantially each said label engaging means including spring-urged retractable pin means mounted thereon and disposed for alignment with said guide rod when said carrier means is disposed in said first position, whereby extension of said label engaging means toward its respective magazine means causes said spring-urged pin means to engage the recess formed in said guide rod; means to simultaneously extend or contract relative to said carrier means in said second direction, said first and second label engaging means being extendible from said carrier means when same is in said first position for engaging the endmost label of each magazine means for permitting said carrier means to thus pick up a pair of labels, said carrier means being then transferred to said second position whereupon said first and second label engaging means are again extended outwardly relative to said carrier means for causing said pair of labels to be positioned in the open opposed mold halves of the press.

4. An apparatus according to claim 3, wherein each label engaging means includes suction means associated therewtih and positioned for engagement with a label so as to hold said label to enable same to be transferred from said magazine means into one of said mold halves due to movement of said carrier means from said first to said second position, said suction means including a pair of suction members disposed for engagment with a label at locations disposed on diametrically opposite sides of said central opening.

5. An apparatus according to claim 4, wherein said carrier means includes a cylinder bore formed therein and extending in said second direction, each of said label engaging means including a piston portion slidably disposed within said bore and interconnected to said suction means for causing movement of same between a retracted position wherein said suction means is disposed closely adjacent said carrier means and an extended position wherein said suction means is spaced outwardly from said carrier means and positioned for either engaging a label located in said magazine means or for positioning a label within one of said mold halves.

* * * * *